United States Patent
Bobroff et al.

(10) Patent No.: US 8,549,515 B2
(45) Date of Patent: *Oct. 1, 2013

(54) SYSTEM AND METHOD FOR COLLABORATIVE HOSTING OF APPLICATIONS, VIRTUAL MACHINES, AND DATA OBJECTS

(75) Inventors: Norman Bobroff, Katonah, NY (US); Andrzej Kochut, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

This patent is subject to a terminal disclaimer.

(21) Appl. No.: 12/058,010

(22) Filed: Mar. 28, 2008

(65) Prior Publication Data

US 2008/0183799 A1 Jul. 31, 2008

Related U.S. Application Data

(63) Continuation of application No. 11/447,163, filed on Jun. 6, 2006, now Pat. No. 7,823,152.

(51) Int. Cl.
*G06F 9/455* (2006.01)
(52) U.S. Cl.
USPC .................................................. 718/1
(58) Field of Classification Search
None
See application file for complete search history.

(56) References Cited

U.S. PATENT DOCUMENTS

| | | | | |
|---|---|---|---|---|
| 6,662,312 B1 * | 12/2003 | Keller et al. | ............... | 714/38.14 |
| 7,356,679 B1 * | 4/2008 | Le et al. | ............................ | 713/1 |
| 7,383,405 B2 * | 6/2008 | Vega et al. | ..................... | 711/162 |
| 7,533,229 B1 * | 5/2009 | van Rietschote | ............ | 711/161 |
| 7,577,722 B1 * | 8/2009 | Khandekar et al. | ........... | 709/220 |
| 7,849,098 B1 * | 12/2010 | Scales et al. | .................. | 707/781 |
| 7,849,462 B2 * | 12/2010 | Traut et al. | ........................ | 718/1 |
| 2003/0217131 A1 * | 11/2003 | Hodge et al. | ..................... | 709/223 |
| 2004/0010787 A1 * | 1/2004 | Traut et al. | ........................ | 718/1 |
| 2004/0225952 A1 * | 11/2004 | Brown et al. | .................. | 714/819 |
| 2005/0198303 A1 * | 9/2005 | Knauerhase et al. | ......... | 709/227 |
| 2005/0268298 A1 * | 12/2005 | Hunt et al. | ........................ | 718/1 |
| 2006/0005189 A1 * | 1/2006 | Vega et al. | ........................ | 718/1 |
| 2006/0155735 A1 * | 7/2006 | Traut et al. | ..................... | 707/101 |
| 2006/0218544 A1 * | 9/2006 | Chakraborty et al. | ......... | 717/168 |
| 2006/0277542 A1 * | 12/2006 | Wipfel | ........................... | 717/174 |
| 2007/0006205 A1 * | 1/2007 | Kennedy et al. | ............... | 717/168 |
| 2007/0204265 A1 * | 8/2007 | Oshins | ................................. | 718/1 |
| 2007/0244937 A1 * | 10/2007 | Flynn et al. | ..................... | 707/204 |
| 2007/0271560 A1 * | 11/2007 | Wahlert et al. | ..................... | 718/1 |

* cited by examiner

*Primary Examiner* — Emerson Puente
*Assistant Examiner* — Hiren Patel
(74) *Attorney, Agent, or Firm* — Whitham, Curtis, Christofferson & Cook, P.C.; Daniel P. Morris

(57) ABSTRACT

To provide collaborative hosting of applications, the present invention first generates a virtual operating system image consisting of operating system code, application code, runtime code and supporting data repositories. The virtual operating system image may then be sent to and deploying on a physical computer or computer terminal at another location.

6 Claims, 6 Drawing Sheets

SYSTEM AND METHOD FOR COLLABORATIVE HOSTING OF APPLICATIONS, VIRTUAL MACHINES, AND DATA OBJECTS

CROSS-REFERENCE TO RELATED APPLICATIONS

This application is a continuation of U.S. patent application Ser. No. 11/447,163, filed Jun. 6, 2006, now issued as U.S. Pat. No. 7,823,152, and which is incorporated herein by reference.

BACKGROUND OF THE INVENTION

1. Field of the Invention

The present invention generally relates to the processing of data processing jobs in data centers.

2. Background Description

Customer applications, and other work or tasks requiring significant resources, are frequently developed at a customer site, even though customer sites may be resource limited environments. Subsequently, after development, the work may be submitted to a large data processing center for execution. Such work is sometimes referred to as "batch" work, but "batch" work may also refer to other large, distributed, or high-performance computing applications. Successful processing of the work in a large data center requires a runtime and hardware environment compatible with the development environment, regardless of whether the development was done at a customer site or at a site maintained by the data center. Submitted work developed at a customer site or other off-site facility may fail and require significant, and costly, debugging at the large data processing center.

The underlying cause of such failure is commonly the circumstance that the various components of the application (e.g., code, runtime libraries, data repositories) are individually deployed with the batch job, or may be substituted by similar—but not identical—resources in the processing center. For example, runtime libraries of the development environment may be substituted by runtime libraries of the data processing center which have subtle but consequential differences from those of the development environment.

A data center is a facility used for housing computers, communications equipment, and other hardware required to execute operating systems in virtual machines.

SUMMARY OF THE INVENTION

One solution is to bundle the application together with libraries and the entire operating system environment in a virtual machine. A virtual machine (VM) is a self-contained operating environment that behaves as if it is a separate computer. A VM executes on physical computer hardware which it may share with other VMs. Each VM runs in isolation as though it was a normal operating system on a physical computer. The VM is unaware that the hardware platform is shared with other VMs. Multiple operating systems may be simultaneously executed on a single computer with each operating system executing in a separate virtual machine. A virtual machine with its applications can be stopped at any time and its state saved to disk. A VM can be migrated to a different physical platform either while executing, or from its state save on disk.

Thus, the present invention provides for an application or business process development to occur within one or more virtual operating system (VOS) images at a customer site, or other off-site development environment. The virtual development environment image (including operating system code, application, runtime code, and supporting data repositories) may then be submitted to a large data processing center to enable the recreating of an application's development environment at the time of execution.

An alternative scheme may create initial virtual machines (VMs) via a service that creates operating system images close to what a customer requires. A standardized operating system image may be sent to a customer for additional customization, and then deployed to a physical machine at either the customer site or a hosting center site.

Migrating VM images offers advantages over the current methods of remote job submission. One significant advantage is that submitted "jobs" do not have to be aware of the environment in which they will run. This approach makes it possible to offer computing services that are independent of the details of the environment. Furthermore, the bundling of an entire operating system image ensures that the development and execution environments are identical. Distributed applications are easily submitted by shipping or transmitting the set of virtual images.

There are considerable advantages in managing an execution environment at a hosting site where multiple customers are hosted.

Virtual images provide improved flexibility in scheduling over applications. The scheduler can now work on virtual images in addition to individual tasks. A virtual image can be brought up on any physical machine, paused, saved to disk, or migrated to another physical platform in response to contention or increasing resource demands.

Submission of VOS images may be facilitated by using SAN mappings to map the storage from the remote site to the processing center. Hybrid forms of submission are also possible, such as the VOS image. The storage containing the database may be remapped using storage virtualization technology, rather than being moved over the network.

The present invention thus provides a method, a system, and a machine-readable medium providing computer instructions for collaborative hosting of applications, comprising the steps of: using a computer to generate a virtual operating system image, said virtual operating system image consisting of operating system code, application code, runtime code, and/or supporting data repositories; sending said virtual operating system image and deploying said image at a physical computer or computer terminal; and migrating said virtual machine between a hosting environment and said computer. The virtual operating system image may be sent via a network, and the network may be the Internet. The hosting environment may be a data center, and the migrating step may include movement back and forth between said hosting environment and said computer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
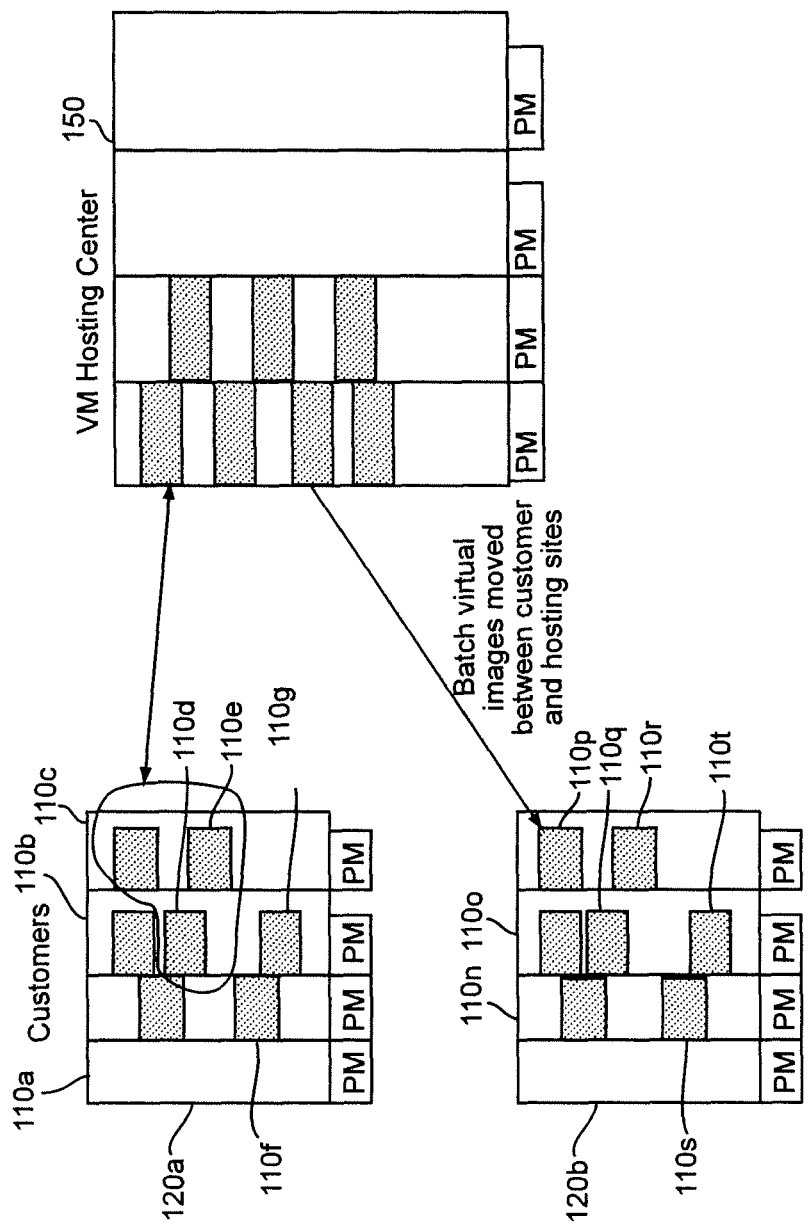
FIG. 1 shows a system for collaborative hosting of virtual machines and data objects according to the present invention.

Referring now to the drawings, and more particularly to FIG. 1, there is shown a system for collaborative hosting of virtual machines and data objects according to the present invention. The system might be used for testing and developing specialized applications for a customer. A VM at a customer site is migrated to a hosting environment when the customer is satisfied with its integrity. The VM may later be moved back to the customer for customization and development. When an application spans multiple VMs 110a, 110b, 110c, 110d, 110e, 110f, 110g, 110n, 110o, 110p, 110q, 110r, 110s, 110t, such as a three-tier web transaction system, an entire set of machines 120a, 120b which the application spans may be migrated to a hosting center 150. Details of co-hosting process are shown on following figures.

Figure 2:
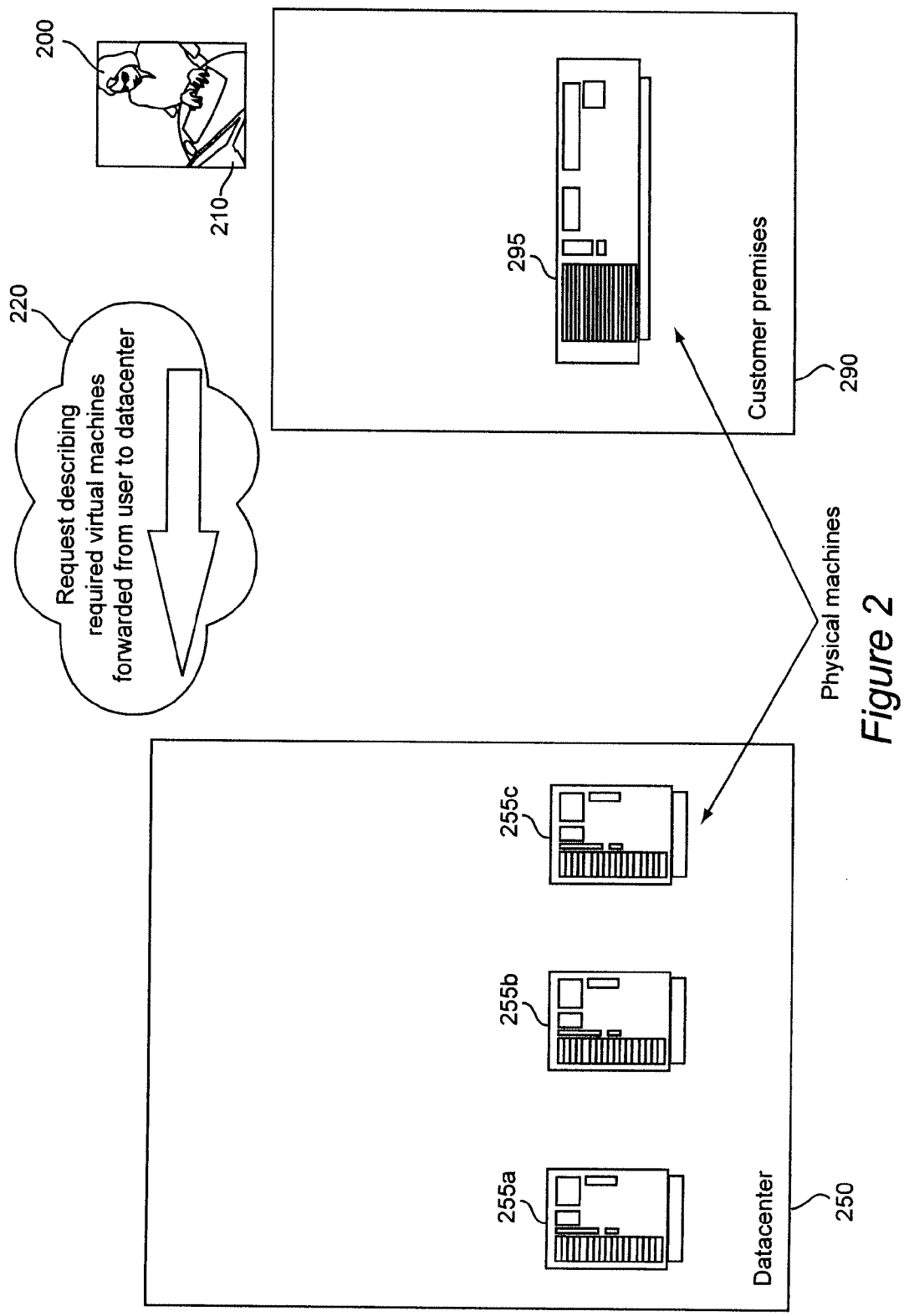
FIG. 2 shows a request for a set of virtual machines and applications.

Referring now to FIG. 2, there is shown a user 200 at a computer terminal 210 who is forwarding, via a network 220, a request to a data center 250 for virtual machines to be made available for use at a customer premises 290. The data center 250 includes physical machines in the form of servers 255a, 255b, 255c, and the customer premises 290 includes a physical machine in form of at least one workstation 295.

Figure 3:
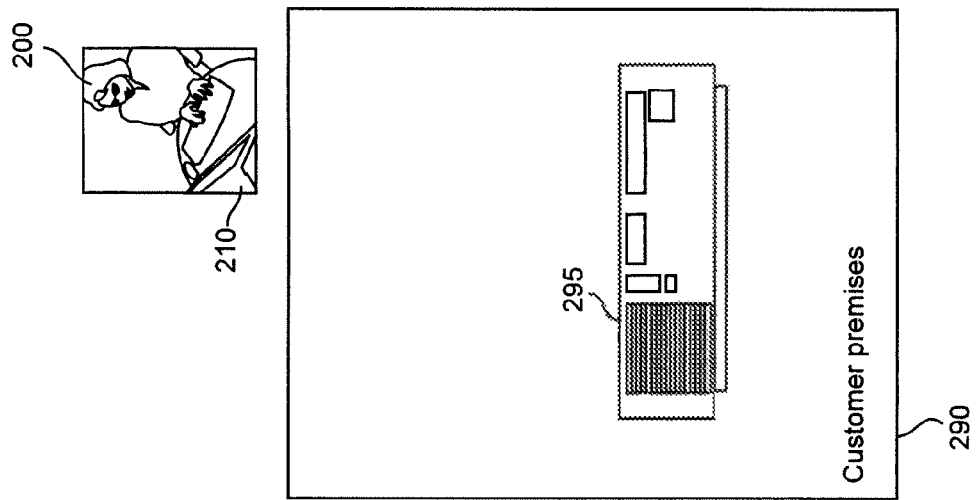
FIG. 3 shows data center creating virtual machines, deployed and tested at the datacenter.
Figure 3:
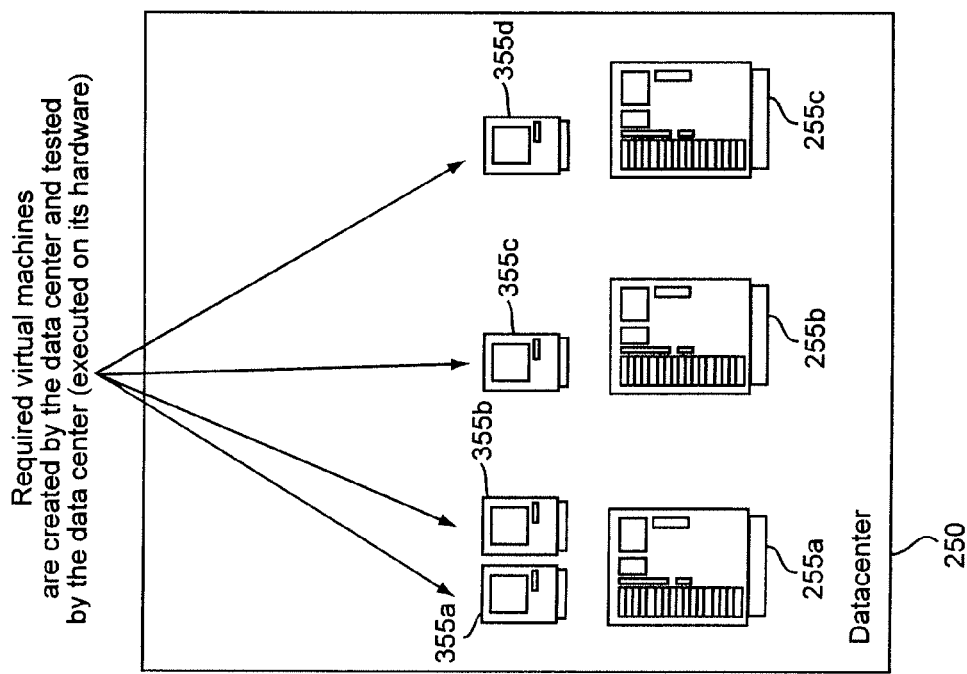

In FIG. 3, there is shown a datacenter 250, where required virtual machines 355a, 355b, 355c, 355d are created and tested by deploying them on the hardware 255a, 255b, 255c of the datacenter 250, and then executing and testing them.

Figure 4:
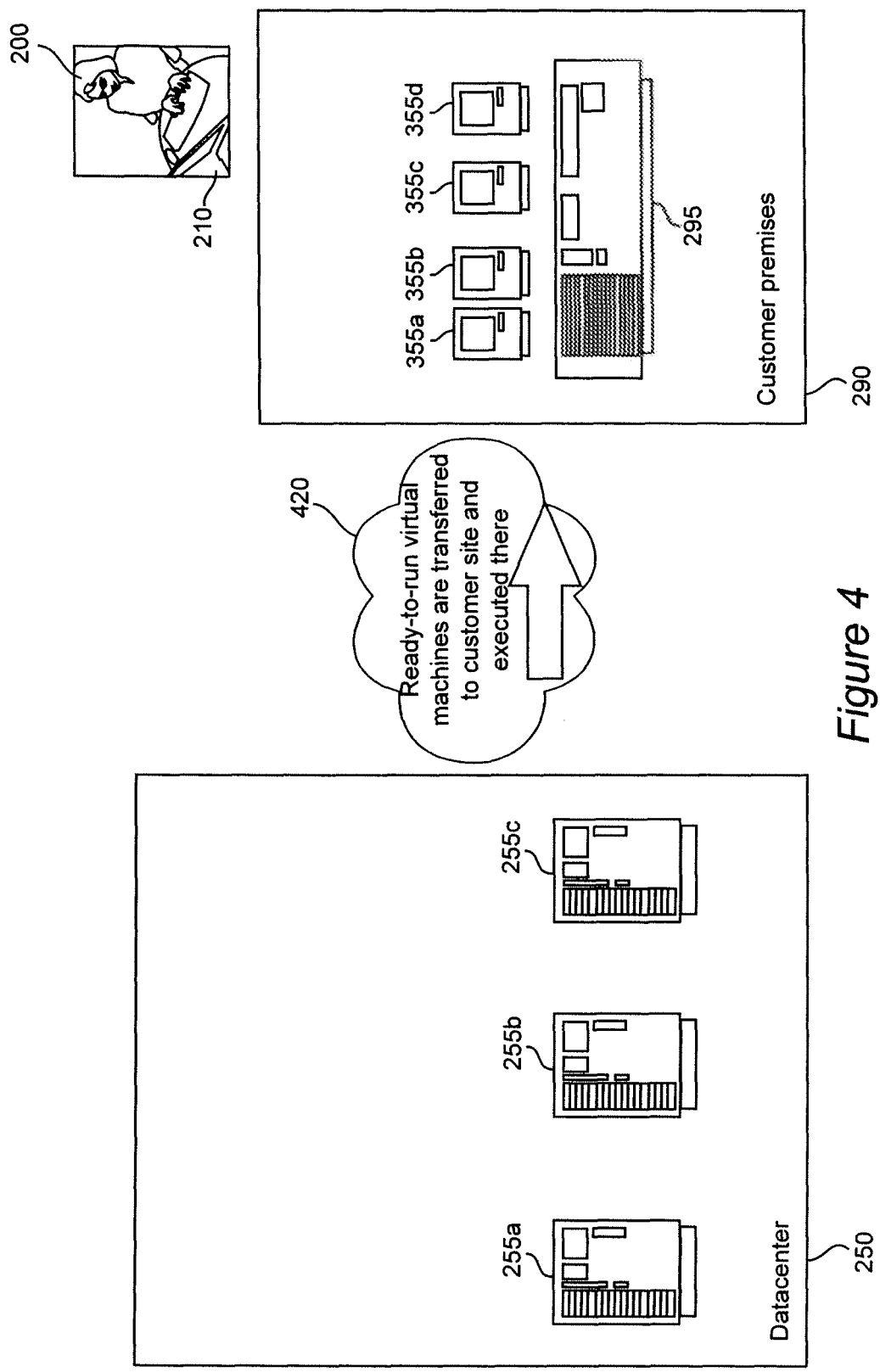
FIG. 4 shows virtual machines transferred to the customer site.

FIG. 4 shows ready-to-run virtual machines 355a, 355b, 355c, and 355d that have been transferred via a network 420 from a data center 250 to a customer premises 290, where the virtual machines are executed.

Figure 5:
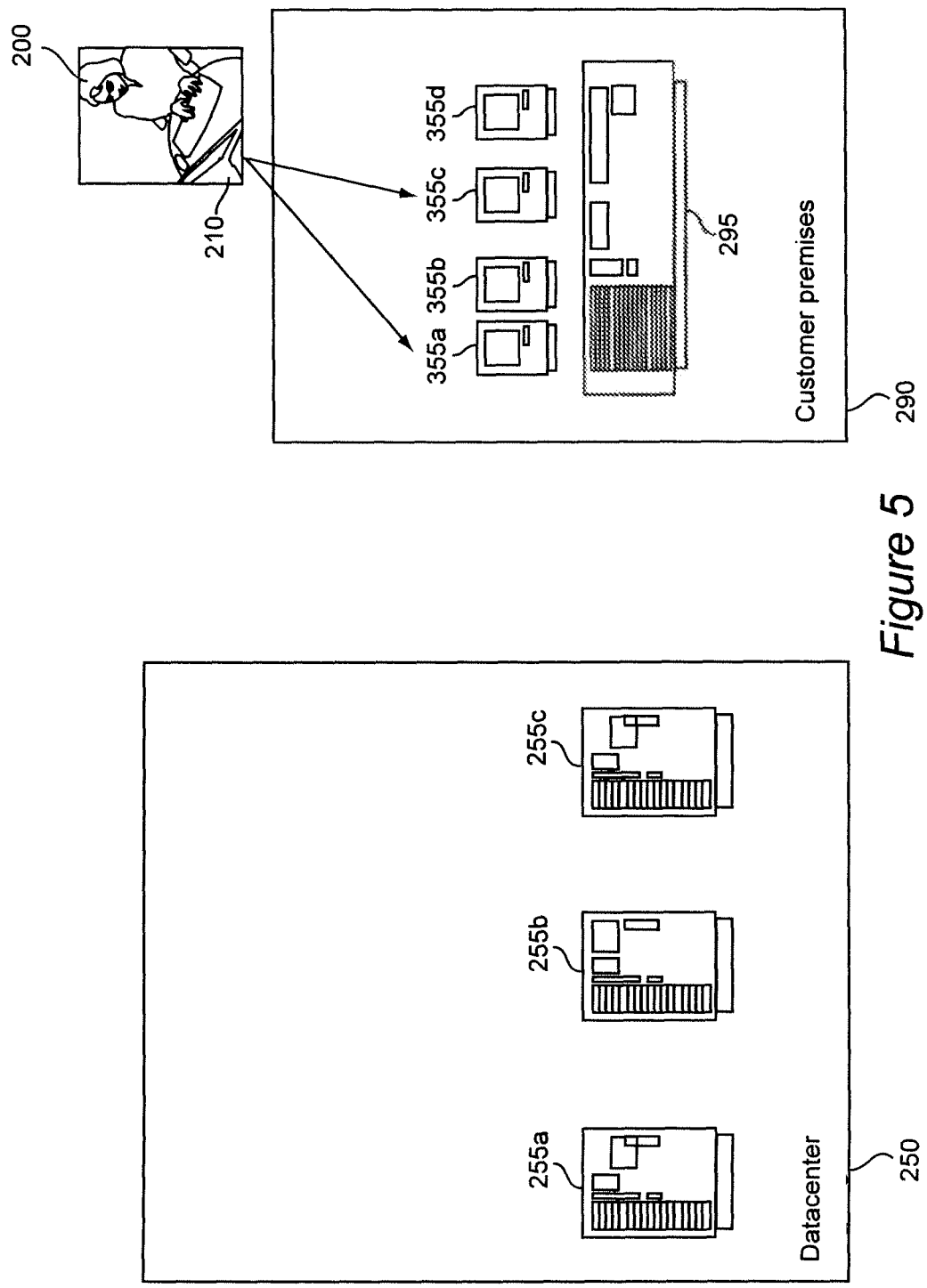
FIG. 5 shows customer customizing and executing virtual machines at customer site.

FIG. 5 shows a user 200 at a terminal 210 customizing virtual machines 355a, 355b, 355c, and 355d and executing them on a physical machine 295 at the customer premises 290.

Figure 6:
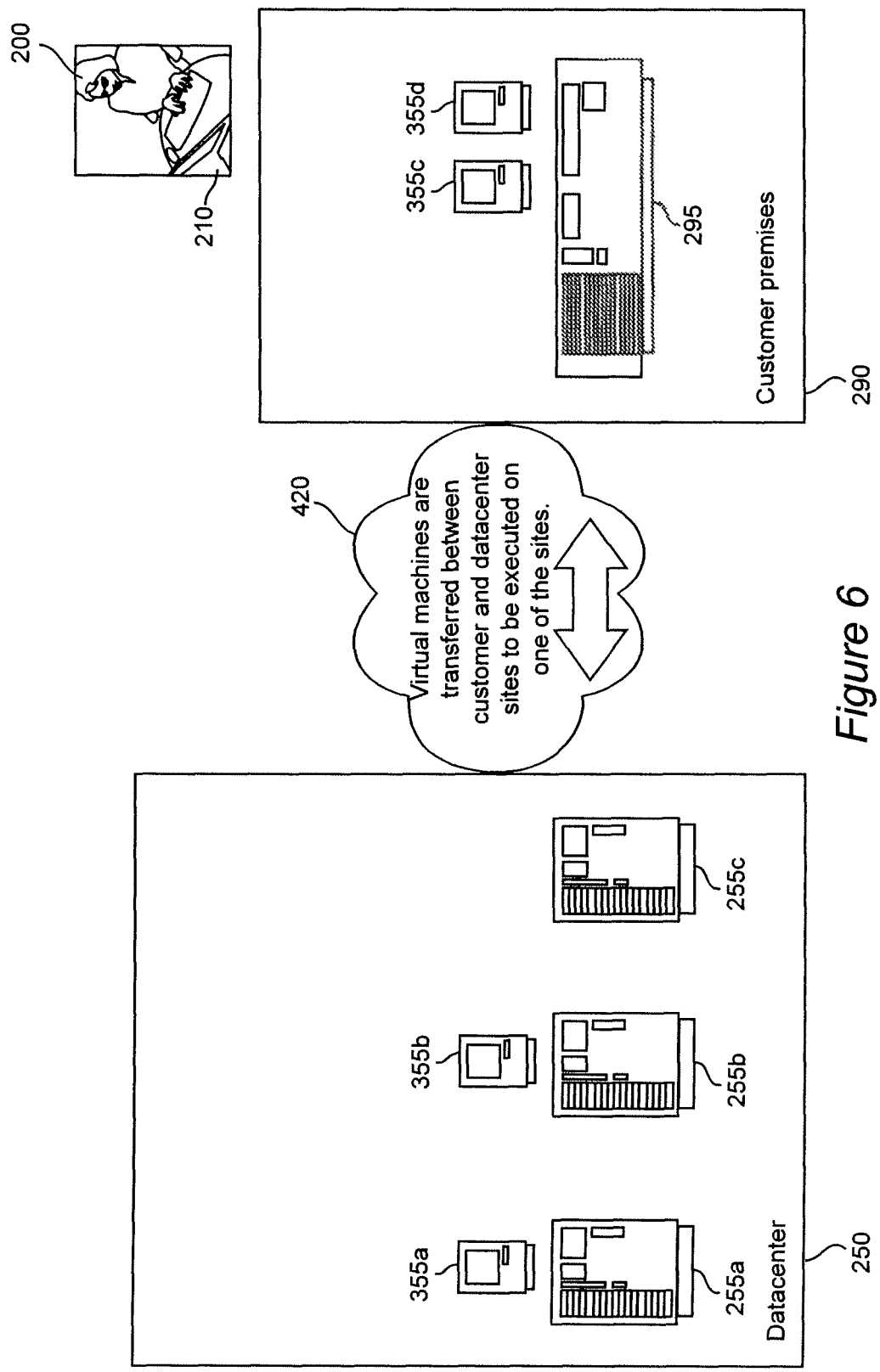
FIG. 6 shows virtual machines executed on customer and/or data center physical machines.

Finally, FIG. 6 shows virtual machines 355a, 355b, 355c, 355d which have been executed both on a customer's physical machine 295 and on datacenter physical machines 255a, 255b, 255c and then transferred via a network 420 between the customer premises 290 and datacenter 250 as needed.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for processing of data processing jobs in a data center, with collaborative hosting of applications in which a development environment and an execution environment are ensured to be identical, including use of a physical machine at either a customer site or a hosting center site, the method comprising the steps of:

generating a computer-generated virtual operating system image, said virtual operating system image comprising one or more of operating system code, application code, runtime code, and supporting data repositories wherein the generating step creates a virtual machine which includes a standardized operating system image close to what is required by a customer;

sending said virtual operating system image to the customer for additional customization and then deploying said virtual operating system image to the physical machine at either the customer site or the hosting center site;

migrating the virtual machine between the data center that is a hosting environment and a computer at a customer site; including, after the virtual machine has an integrity that has satisfied a customer, migrating the virtual machine from the customer site to the hosting environment, followed by later moving the virtual machine back to the customer site for customization and development; wherein:

the data center is a facility that houses computers, communications equipment and hardware required to execute operating systems in virtual machines; and said migrating step includes a movement back and forth between said hosting environment which is the data center and said computer at the customer site; and bundling an entire operating system image which is a virtual development environment image that comprises operating system code, application code, runtime code, and supporting data repositories and submitting, to a large data center, the bundled entire operating system image; followed by recreating of an application's development environment at a time of execution and ensuring that the development environment and the execution environment are identical.

2. The method of claim 1, wherein the virtual operating system image is sent via a network.

3. The method of claim 2, wherein the network is the internet.

4. The method of claim 1, practiced for a three-tier web transaction system and wherein the method includes migrating an entire set of virtual machines to the data center.

5. The method of claim 1, including transferring multiple virtual machines via a network from the data center to the customer site.

6. The method of claim 1, including migration of a plurality of virtual machines from the customer site to the data center.

* * * * *